US011653090B1

(12) United States Patent
Farjadrad

(10) Patent No.: US 11,653,090 B1
(45) Date of Patent: May 16, 2023

(54) INTELLIGENT DISTRIBUTED SYSTEMS AND METHODS FOR LIVE TRAFFIC MONITORING AND OPTIMIZATION

(71) Applicant: Ramin Farjadrad, Los Altos, CA (US)

(72) Inventor: Ramin Farjadrad, Los Altos, CA (US)

( * ) Notice: Subject to any disclaimer, the term of this patent is extended or adjusted under 35 U.S.C. 154(b) by 0 days.

(21) Appl. No.: 16/028,390

(22) Filed: Jul. 5, 2018

Related U.S. Application Data

(60) Provisional application No. 62/528,462, filed on Jul. 4, 2017.

(51) Int. Cl.
| | | |
|---|---|---|
| *H04N 7/18* | (2006.01) | |
| *H04N 5/232* | (2006.01) | |
| *H04W 4/029* | (2018.01) | |
| *H04N 5/247* | (2006.01) | |

(52) U.S. Cl.
CPC ..... *H04N 5/23206* (2013.01); *H04N 5/23293* (2013.01); *H04N 5/247* (2013.01); *H04N 7/181* (2013.01); *H04W 4/029* (2018.02); *G06T 2207/30244* (2013.01); *H04N 2201/3253* (2013.01)

(58) Field of Classification Search
None
See application file for complete search history.

(56) References Cited

U.S. PATENT DOCUMENTS

| | | | | |
|---|---|---|---|---|
| 6,970,183 B1 * | 11/2005 | Monroe | ............... | G08B 7/062 348/143 |
| 2002/0045988 A1 * | 4/2002 | Yokota | ............... | G01C 21/20 701/484 |
| 2014/0078304 A1 * | 3/2014 | Othmer | ............... | G06K 9/00771 348/148 |
| 2014/0218529 A1 * | 8/2014 | Mahmoud | ............... | H04N 5/23241 348/148 |
| 2019/0384294 A1 * | 12/2019 | Shashua | ............... | G05D 1/0088 |

* cited by examiner

*Primary Examiner* — Christopher G Findley
(74) *Attorney, Agent, or Firm* — Weaver Austin Villeneuve & Sampson LLP

(57) ABSTRACT

A distributed system for live traffic monitoring and optimization includes a central computer and a plurality of mobile client devices at different geographical locations. Each mobile client device may run a software application to capture images of its current location and the associated location coordinates of each image and communicate the combined digital data of each location to the central computer. The central computer may collect the digital data of every location from all mobile client devices in that location, continuously updating and processing them to provide the most up-to-date and comprehensive graphical information of any location.

15 Claims, 9 Drawing Sheets

INTELLIGENT DISTRIBUTED SYSTEMS AND METHODS FOR LIVE TRAFFIC MONITORING AND OPTIMIZATION

CROSS-REFERENCE TO RELATED APPLICATIONS

This application claims priority under 35 U.S.C. § 119 to U.S. Provisional Application Ser. No. 62/528,462 filed on Jul. 4, 2017, the content of which is incorporated by reference herein in its entirety.

TECHNICAL FIELD

This invention relates to digital imaging and, in particular, to distributed systems for capturing and providing images of public places.

BACKGROUND

Unless otherwise indicated herein, the elements described in this section are not prior art to the claims and are not admitted to be prior art by inclusion in this section.

Mapping and navigation applications and systems such as Google Maps, Apple Maps, Waze, GPS (Global Positioning System) navigation units, and other such system are commonly used for vehicle navigation and trip planning, and generally provide some indication of traffic loads, suggested routes and related information. However, such systems lack real-time imaging and are of limited reliability.

While most people today have a mobile phone with both camera and GPS capability, in many cases mobile phones may not be the proper devices to capture enough relevant graphic/location information for the system to build a rich and useful graphic database for most practical purposes. Among the first-level problems with use of a mobile phone is that people may not feel comfortable to give an app access to capture graphic data even when they are in public areas because they have concerns they may forget to turn the access off when they go in a private place. Another problem is the graphic data taken by the phones are not easy to map to a specific location accurately as the angle and direction of the mobile camera is unknown, and additionally a person carrying a mobile camera typically covers a very limited area unless s/he is riding on a car or bike and keeps its mobile camera and GPS on with proper angle at most times. The above conditions are very unlikely to happen as most rarely hold a mobile camera at proper and relative fixed angle at all times, and there may be movements due to human nature. Even if one person does so, s/he will capture only one angle, and s/he has to make sure that it is a proper angle to capture most of the surroundings in the path. Lastly, s/he will not keep the mobile camera and GPS on for a long time because of issues such as battery life of the mobile phone, among other issues.

However, with the rise of autonomous cars, there will be an increasing availability of high-resolution cameras capturing every angle of view in their paths and these captured graphic data have many common features that may make them useful for an improved, intelligent distributed system and method for live traffic monitoring and optimization, as described herein.

SUMMARY

The following disclosure describes a system with an innovative technology solution that enables the users of the system to access the most recent (and in some cases live) 360-degree images and videos (graphic data) of public places, and specifically public roads, streets, highways. There are many applications and uses for such extremely rich graphic information, the simplest of which may be use of the graphic data to learn about the latest activities happening in a user's area of interest. For example, people can use the graphic data to check the current activities around their home while they are away, parents can check the activities around their kids' school, drivers can check live graphic data of roads they are planning to take, etc.

In an example embodiment, a distributed system for live traffic monitoring and optimization may include a central computer and a plurality of mobile client devices (e.g., smart phones and/or smart vehicles) at different geographical locations. Each mobile client device may run a software application to capture the graphical images of its current location (by a digital camera) plus the associated location coordinates of each image (by a GPS device) and communicate the combined digital data of each location to the central computer. A central computer system (which may comprise a networked server, multiple distributed servers and/or cloud-based servers or services) may collect the digital data of every location from all mobile client devices in that location, continuously updating and processing them to provide the most current and comprehensive graphical information of any location.

In some example embodiments, the mobile client devices are smart or autonomous vehicles (referred to herein as "Smart Vehicles") equipped with digital cameras that capture digital images of the locations the vehicle travels by with very similar orientations, angles and directions, thereby making it easy to construct reliable 360-degree images. Also the central computer can easily update such images as they are received from several different Smart Vehicles.

In some embodiments, a decision to upload a new image from the mobile client device to the central computer is dependent on the amount of change in the client device location as measured by the client GPS device (e.g., to limit the amount of data transferred). If the Smart Vehicle is not traveling significantly lower speed than the average speed of the vehicles on that street, the image data may be limited to the side images of the vehicle (excluding front and rear images), e.g., to reduce the amount of data uploaded.

In some embodiments, when multiple Smart Vehicles connected to the central computer are detected to be traveling on a same road, the data upload of images from different positions along the road may be distributed among the multiple Smart Vehicles so as to reduce the upload rate on a single vehicle.

In some embodiments, when the central computer detects a new connected Smart Vehicle traveling through a road that a first connected Smart Vehicle traveled through within a predefined time window, the central computer may inform the first Smart Vehicle that is still uploading the image information of that road to lower its upload rate, e.g., by uploading images captured at larger distance from each other, and may inform the new vehicle to capture images at locations where the first vehicle is not uploading images.

In some embodiments, an image received from each vehicle may be processed based on its GPS data as well as the relative location of the common landmarks in each image, such that a previous image of a certain location from one vehicle can be updated with a new image of that location from another vehicle.

In some embodiments, the software application running on the mobile client device may be configured to detect humans and/or animals in the captured images, and may reduce the resolution of images where humans and/or animals are detected.

In some embodiments, the software application running on the mobile client device may be configured to detect the time-sensitive versus non-time-sensitive information in the captured images, and to upload the time-sensitive information right away, and the non-time-sensitive information when the client device has higher data bandwidth (e.g., when connected to WiFi).

In some embodiments, the mobile client device may include instructions to upload a lower resolution of the images captured as soon as there is a data connection, and to upload a higher resolution of the images when the client device has higher data bandwidth (e.g., when connected to WiFi).

In some embodiments, to reduce the amount of graphical data storage on the central computer, the number of captured images within a certain window of time (e.g., a day) may be reduced based on how far in the past the images were captured.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the invention.

BRIEF DESCRIPTION OF THE DRAWINGS

Example embodiments are described herein with reference to the drawings.

Like reference numerals refer to the same or similar components throughout the several views of the drawings.

DETAILED DESCRIPTION

Described herein are apparatus and methods for live traffic monitoring and optimization. In the following description, for purposes of explanation, numerous examples and specific details are set forth in order to provide a thorough understanding of the present invention. It will be evident, however, to one skilled in the art that the present invention may include some or all of the features in these examples alone or in combination with other features described below, and may further include modifications and equivalents of the features and concepts described herein.

I. SYSTEM OVERVIEW

Figure 1:
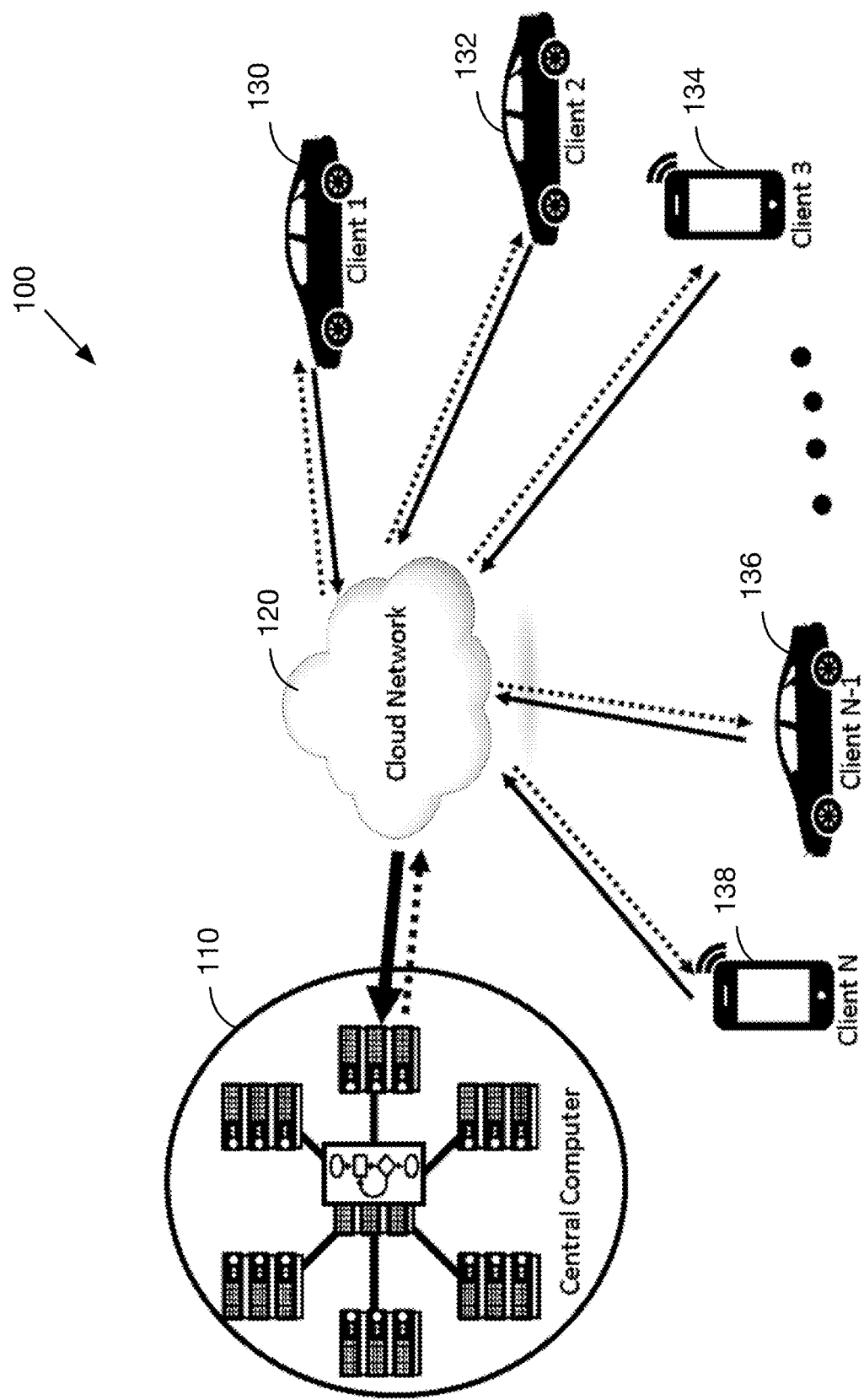
FIG. 1 is a schematic illustration of a distributed system for live traffic monitoring and optimization in accordance with one or more example embodiments.

Referring to FIG. 1, an example system for live traffic monitoring and optimization (sometimes referred to herein for convenience as a "UnifEye system") 100 may include a central computer 110 (sometimes referred to herein as a "UnifEye Central Computer", or "UCC") and one or more client devices, or clients, 130, 132, 134, 136, 138, in communication over a network 120 with the UCC.

In some embodiments, a client may be any of a mobile device (e.g., a mobile phone, tablet, or other smart mobile device), a smart vehicle, or other device or system having a camera, GPS or other location services, and a network interface. For example, in the schematic illustration of example system 100, clients 130, 132, 136 are shown as smart vehicle clients and clients 136 and 140 are shown as mobile devices. Client devices are sometimes generally referred to herein as "Client Smart Mobile" devices, "CSM", or simply "Client".

Central Computer 110 may be a single computer system or server, or may be a distributed or cloud system comprising multiple servers, services, and/or resources. Similarly, Network 230 may comprise the Internet and/or any combination of wired or wireless communication networks.

Figure 2:
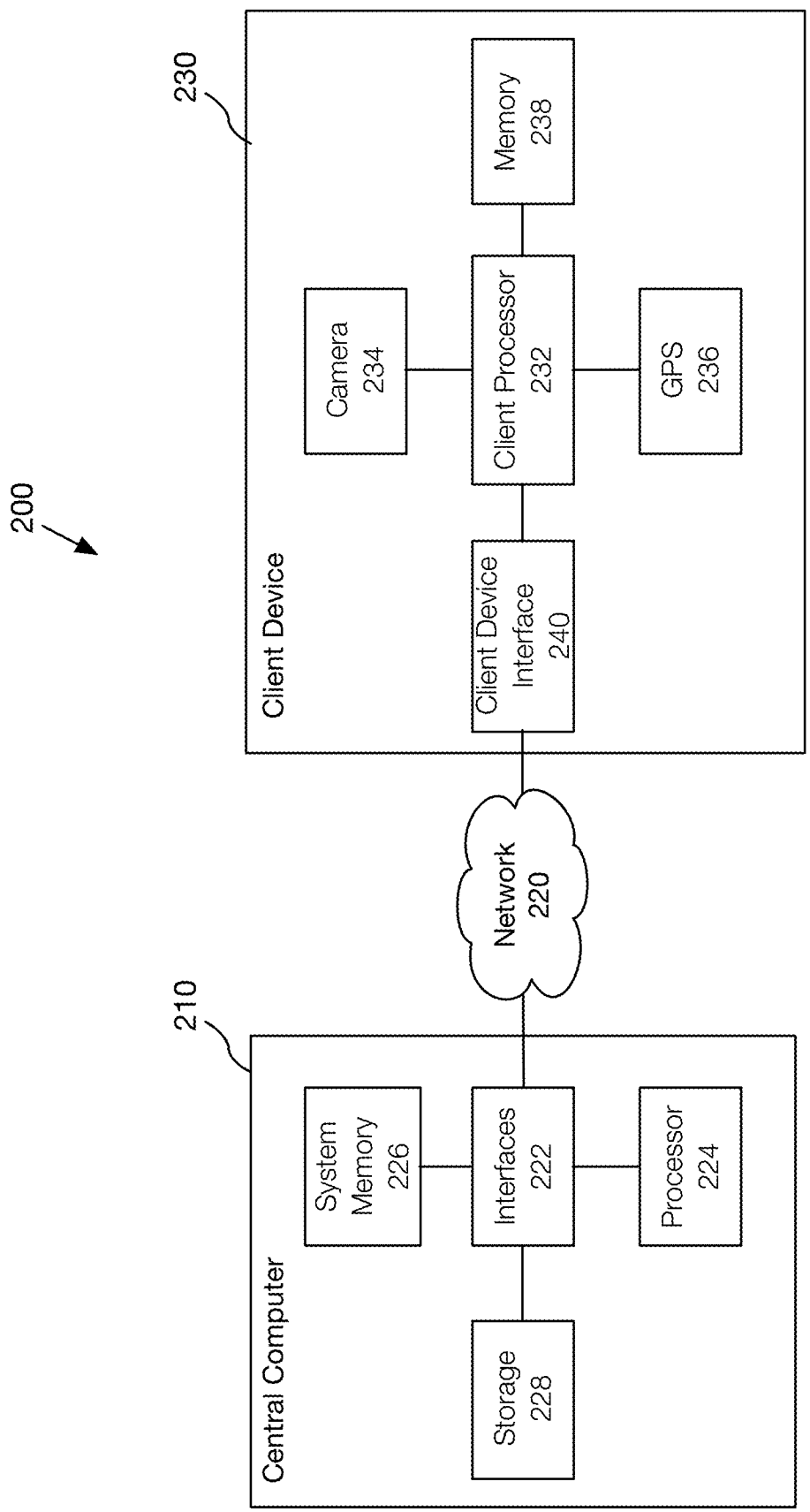
FIG. 2 is a schematic illustration showing features or modules of a central computer and a client device of the system of FIG. 1, in accordance with one or more example embodiments.

Referring to FIG. 2, in some embodiments, similar to system 100, a UnifEye system 200 may include a central computer 210, network 220, and one or more client devices 230. Central computer may comprise one or more computer systems, distributed servers, and/or cloud-based services, and may include a number of components or modules, including, for example, one or more interfaces 222. Interfaces 222 can include one or more wired or wireless interfaces that are configurable to communicate via a network, such as network 220. Wireless interfaces can include one or more wireless transmitters, receivers, and/or transceivers, such as a Bluetooth transceiver, a Zigbee transceiver, a Wi-Fi transceiver, a WiMAX transceiver, and/or other similar type of wireless transceiver configurable to communicate via a wireless network. Wired interfaces can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wired network.

Processor 224 can include one or more general purpose processors and/or one or more special purpose processors (e.g., digital signal processors, application specific integrated circuits, etc.). Processors 224 can be configured to execute computer-readable program instructions that are stored in storage 228 and/or other instructions as described herein, for example, to perform the processes and methods as described below with respect to FIGS. 5 and 6.

Storage 228 can include one or more computer-readable storage media that can be read and/or accessed by at least one of processors 224. The one or more computer-readable storage media can include volatile and/or non-volatile storage components, such as optical, magnetic, organic or other memory or disc storage, which can be integrated in whole or in part with at least one of processors 224. In some embodiments, data storage 224 can be implemented using a single physical device (e.g., one optical, magnetic, organic or other memory or disc storage unit), while in other embodiments, data 224 can be implemented using two or more physical devices.

System memory 226 may include high-speed random access memory (RAM) and/or other volatile or non-volatile memory, e.g., for performing functions in accordance with instructions stored in storage 228, memory 226 or received via interfaces 222, or otherwise as directed by processor 224. Storage 228 and/or Memory 226 may store an operating system (or set of instructions), such as Linux, Unix, macOS, or Windows, that includes procedures for handling basic system services and for performing hardware independent tasks.

Client devices 230, which may be the same or similar to devices 130 in FIG. 1, may include one or more processors for controlling overall operation and functionality of the device and/or its components and for processing data. One or more cameras 234 may be used to capture digital images (e.g., still images or video), and a GPS 236 or other location system may be used to determine location of the device 230. Memory 238 may include an application (e.g., a UnifEye system App) and/or instructions for interfacing with a user, capturing images, and performing processes or methods as described herein (e.g., with respect to FIGS. 3 and 4). Camera 234 may be a digital camera for capturing still images and/or video, and may be integrated within a mobile device, a smart or autonomous vehicle, a dashboard camera, a camcorder, and/or an external camera (e.g., placed at a traffic intersection).

In some embodiments, a proposed system 200 may collect graphical information with the associated location tags of any public place from its own user base. The users of the system need to carry smart mobile devices that run the system App and giving the App permission to control their camcorder & GPS devices to activate them when they are in public places. To improve privacy, every time the App wants to take any image, it asks the user if s/he is in a public area or not.

Benefits of utilizing cameras 234 in smart vehicles (e.g., autonomous cars) include, for example, car cameras that typically turn on only when they are moving, which happens in outdoor environments and not indoor environments, and may trigger privacy concerns. Some rare possibilities are when someone drives her car on a private road. Chances of having privacy concerns on a private road are by far much lower than a public road, but in such scenarios, the UnifEye system is smart enough to tell based on available maps that it is not a public road and ask for permission from the user/driver to upload such data or not. (This does not work well with cell phones, as a GPS system does not have the accuracy of less than 3 m, which is not good enough to tell if someone is on a public road/street or inside a room in a house/apartment that is right next to that street).

Another advantage is that cars always have their GPS systems on, and their location can be properly mapped based on the existing navigation maps.

The angle, position, and direction of graphic data captured by car cameras from different cars are very similar as they are placed on specific common locations on a car, so the autonomous driving system captures the information it needs for proper navigation. Even if different cars use different autonomous driving systems, which require the cameras to be placed in different locations, as long as the car model is provided to the UnifEye system, it can adjust the captured graphic data accordingly to account for the locations of the cameras on that specific car model. Therefore, all captured graphic data from cars can be aligned with limited proper adjustments to complement themselves.

Cars have cameras that capture graphic data from front, rear, and sides. So the graphic data is fairly rich to build a complete 360-degree view of the road it travels on.

While a goal is to provide the latest and most recent graphic data from any public place, considering that on certain roads there will be higher traffic than others, and many cars will be capturing the graphic data from the same location and almost at the same time, there needs to be a smart algorithm to limit the amount of data collected. A proposed algorithm for efficient data capture and storage can look like the following:

Most of the graphical information about the locations does not change over time, such as the markings on the streets, traffic lights, trees and, in general, most of fixed landmarks, which appear mostly in the part of the image captured from the front and rear of the car. Side images are the parts that have more information. So only the differences in the received graphical data can be saved, and not the whole data every time.

A similar idea can also be applied to the uploaded data to reduce the amount of data uploaded that can hog the wireless bandwidth. For example, the UnifEye App knows which road the car is traveling on, and if the system already has the images of that road, it can reduce the graphical data to be uploaded by excluding those fixed landmarks.

An exception here is when the car is moving at a much different speed than the average speed on that road. In that scenario, the front image becomes important to share as that means there is a difference on the road condition that is worth being communicated.

The graphical data captured from each car camera will never be exactly the same, however, as slight differences in the camera angle, the lane of the car, and even the exact location of the car within a lane can cause differences in the graphical data captured. So to properly identify the actual differences in graphical data from different cars, the graphical data from all cars are aligned to certain landmarks on the road, and after adjustment is done, a difference is identified if the correlation delta on same points/locations exceeds a certain predetermined factor.

To build a 360-degree image at any location along a road, a car camera does not need to constantly capture a video. The graphic data capture can happen only at a certain delta distance to build a complete 360-degree view, and the delta distance at which each capture happens can be a function of the camera's resolution.

Humans and animals in the images do not need to be captured with high resolution as they do not add much to the graphical information users are looking for. So the UnifEye software running the car can detect humans and animals rather than having a high-resolution image of them in the graphical data uploaded, or include just a low-resolution version or a silhouette of them. That is also a good feature to have for privacy purposes.

To reduce the total upload bandwidth from cars running the UnifEye App in a certain location, the graphic data sharing can be distributed among cars that are in a certain location within a certain interval of time. The system is aware of the locations of all cars running the app, so it can schedule the uploads from those cars such that each upload the graphic data from a location on that road with the specified delta distance. For example, if there are two cars traveling on a certain road with UnifEye app running on them, and the first car has already captured a graphic image at a certain location, the next graphic image, which is supposed to be taken at a specified delta distance from the first image, is taken by the next car, and so on. Basically, the images are still uploaded at the same delta distance, but the uploads alternate between the two cars. Thus, each of the two cars uploads images at half the rate as if it were the only car on that road running the UnifEye app.

Less time-sensitive graphic information captured by each car can be uploaded to the system overnight or at times when internet traffic from other sources is lower.

Unified App running on cars can also download the images from sources like Google Street View, and, based on existing images on Google, it eliminates some of the existing graphical data captured by the car that is redundant before uploading.

Similar concepts to reduce the upload rate can also be used for reducing the storage size in the system.

Another algorithm to reduce the amount of graphical data storage on the system is to reduce the capture resolution (or frequency) of any given path based on how far in the past it was taken. For example, the resolution (or frequency) of captures for today is the highest, for days within the past week it is reduced by a factor of two, and within the last month by a factor of four, and so forth.

II. EXAMPLES: CAPTURING AND PROCESSING IMAGE DATA (FIGS. 3-6)

Figure 3:
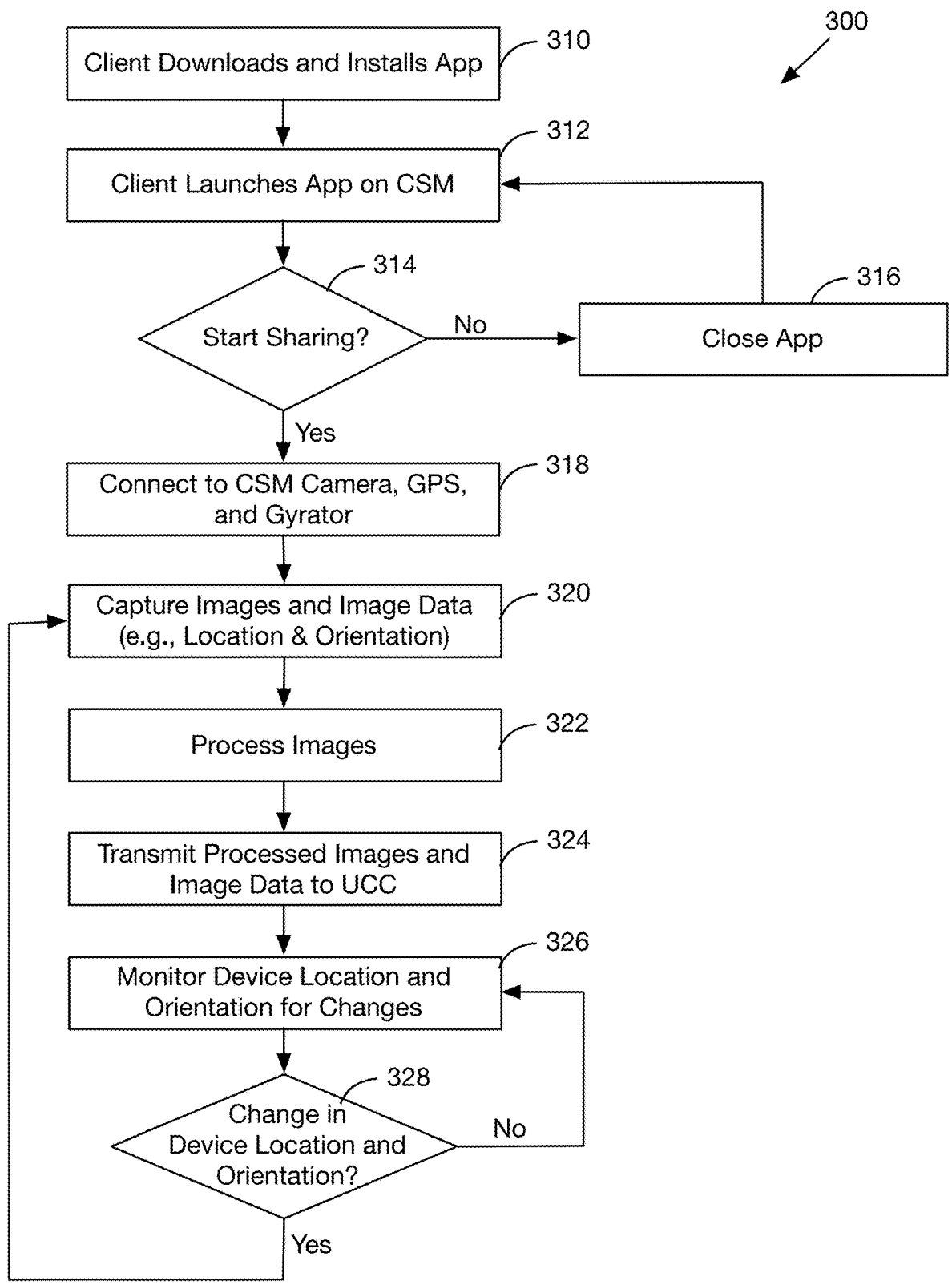
FIG. 3 is a flow chart illustrating a process of capturing image data by a client smart mobile device in accordance with one or more example embodiments.

Referring to FIG. 3, an example method 300 for capturing and processing image data in a client smart mobile device (CSM) may include the client device in 310 downloading and installing a UnifEye mobile application (sometimes referred to herein as "App" or "UEA") on the CSM, which may include or is connected to a camera, GPS, and optionally a gyrator device, e.g., as shown and described with respect to FIG. 2.

Client launches 312 UEA from CSM local memory and the app starts running on CSM device processor.

UEA asks 314 the Client if she wants to start sharing the location graphical information.

If YES, go to 318, if NO, Close UEA till next time UEA is launched.

In 318, UEA starts connecting to the CSM device Camera, GPS, and Gyrator device, and 320 starts capturing the current location coordinates, orientation (e.g., North, South, East, West) as well as the first captured images from the camera. CSM may then process 322 the image to reduce transmission data size (e.g., by removing the duplicate data that is common between images), and transmit 324 the combined image data (image, location, orientation, time) to UnifEye Central Computer (UCC).

In 326, the CSM device may continuously monitor the device coordinates and orientation for changes beyond a particular threshold or predetermined value(s). For example, if the delta between the new orientation and any of the old orientations, coordinates, or time is smaller than certain predetermined values (e.g., less than 90-degree change in orientation or 5 m-10 m change in coordinates, which is dependent on the camera angle of view), then go to 326 and continue monitoring. However, if/when the delta between the old and new coordinates is greater than the predetermined value (e.g., 5 m-10 m) or the orientation is greater than the predetermined value (e.g., —90 degrees), or time is greater than the predetermined value (e.g., —5 minutes), go to 320 and capture new images and repeat unless/until UEA is terminated by the client/user.

Figure 4:
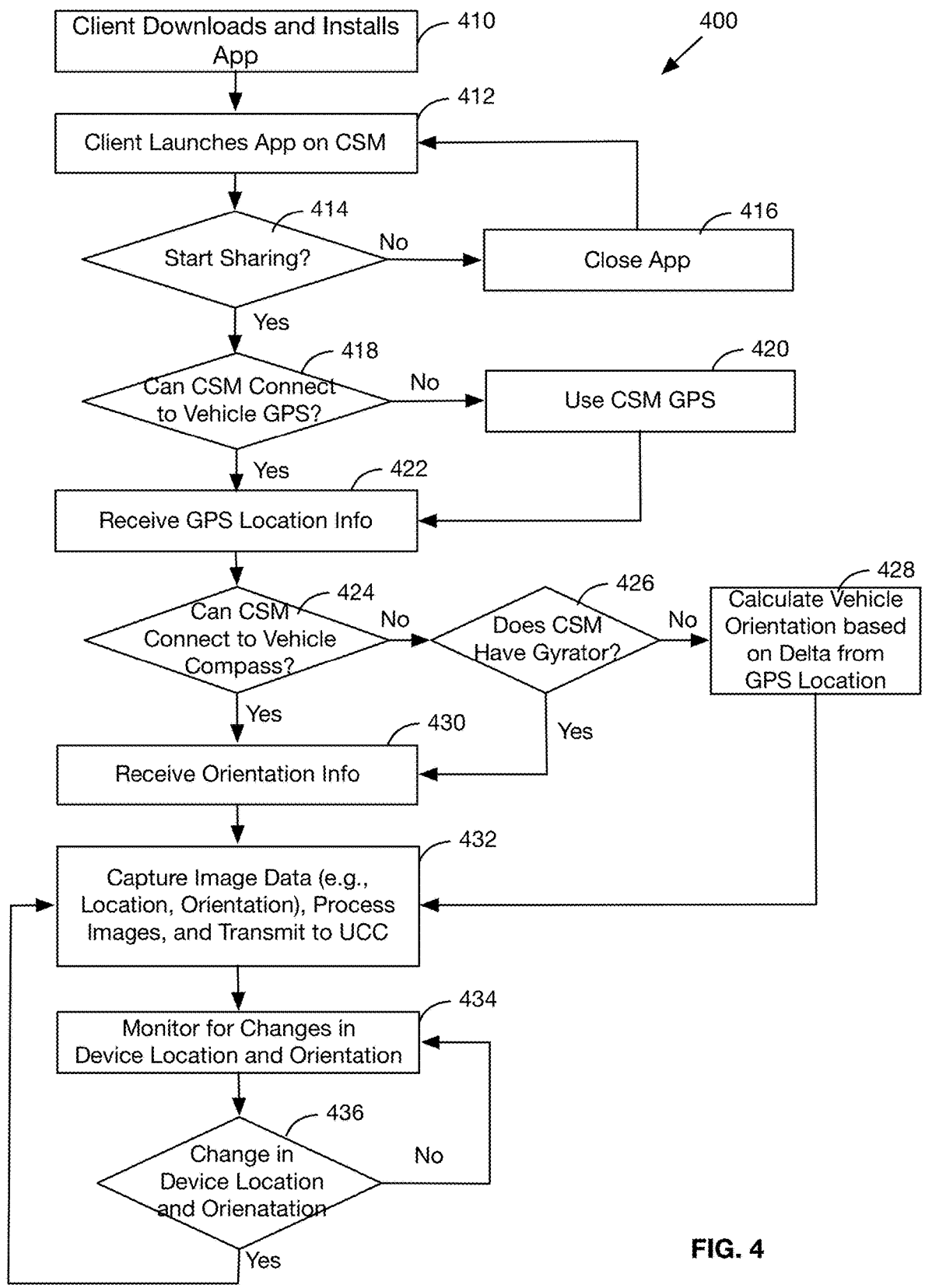
FIG. 4 is a flow chart illustrating a process for capturing image data in a smart automobile in accordance with one or more example embodiments.

Turning now to FIG. 4, an example process 400 for capturing image data in a smart automobile is shown. Steps of such process or method may be similar to process 400, and may include 410 downloading/installing the UEA App on the Client Smart Mobile device, such as a smartphone that is connected at least to the smart automobile cameras (e.g., through an interface to the smart automobile).

Client launches 412 the UEA App from its local memory and it starts running on the CSM processor.

UEA asks 414 the client/user if she wants to start sharing graphical information of the location. If the user selects YES, go to 418 and determine whether CSM can connect to a vehicle's GPS. If YES, then go to 422 and receive the GPS location information.

If in 414 the user/client chooses not to share location information, the App may close 416 until it is launched again in 412.

If in 418 it is determined that the CSM cannot connect to the vehicle's GPS, the system may use the CSM GPS (rather than the vehicle GPS) to receive GPS location information in 422.

In 424, UEA identifies if the CSM device can also connect to an automobile's compass device to capture location. If yes, go to 430 and receive orientation information. If 424 is NO, determine in 426 if the CSM has a gyrator. If yes, then receive orientation info 430 from the gyrator. If NO, calculate 428 vehicle orientation based on the delta from the GPS location, and proceed to 432.

In 432, UEA starts capturing the current location coordinates and orientation as well as the first captured images from front/rear/left/right angles of the car, processing the images to reduce transmission data size (e.g., by removing the duplicate data that is common between images), and transmitting the combined image data (image, location, orientation, time) to UnifEye Central Computer (UCC).

In 434, the CSM device continuously monitors the car coordinates and orientation for changes, e.g., changes beyond a threshold or one or more predetermined parameter values. For example, if in 436 the delta between the new orientation and any old orientation, coordinates, or time is smaller than certain predetermined values (e.g., delta less than 90 degrees in orientation or 5 m-10 m coordinates dependent on the camera angle of view), then go to 434 and continue monitoring for changes.

If in 436 the delta between the old and new coordinates is larger than a predetermined value (e.g., 5 m-10 m), the orientation is larger than a predetermined value (e.g., ~90 degrees), or the time is larger than a predetermined value (e.g., —5 minutes), go back to 432 and capture new images from front/rear/left/right angles of the car. Continue the process unless/until the UEA is terminated.

Figure 5:
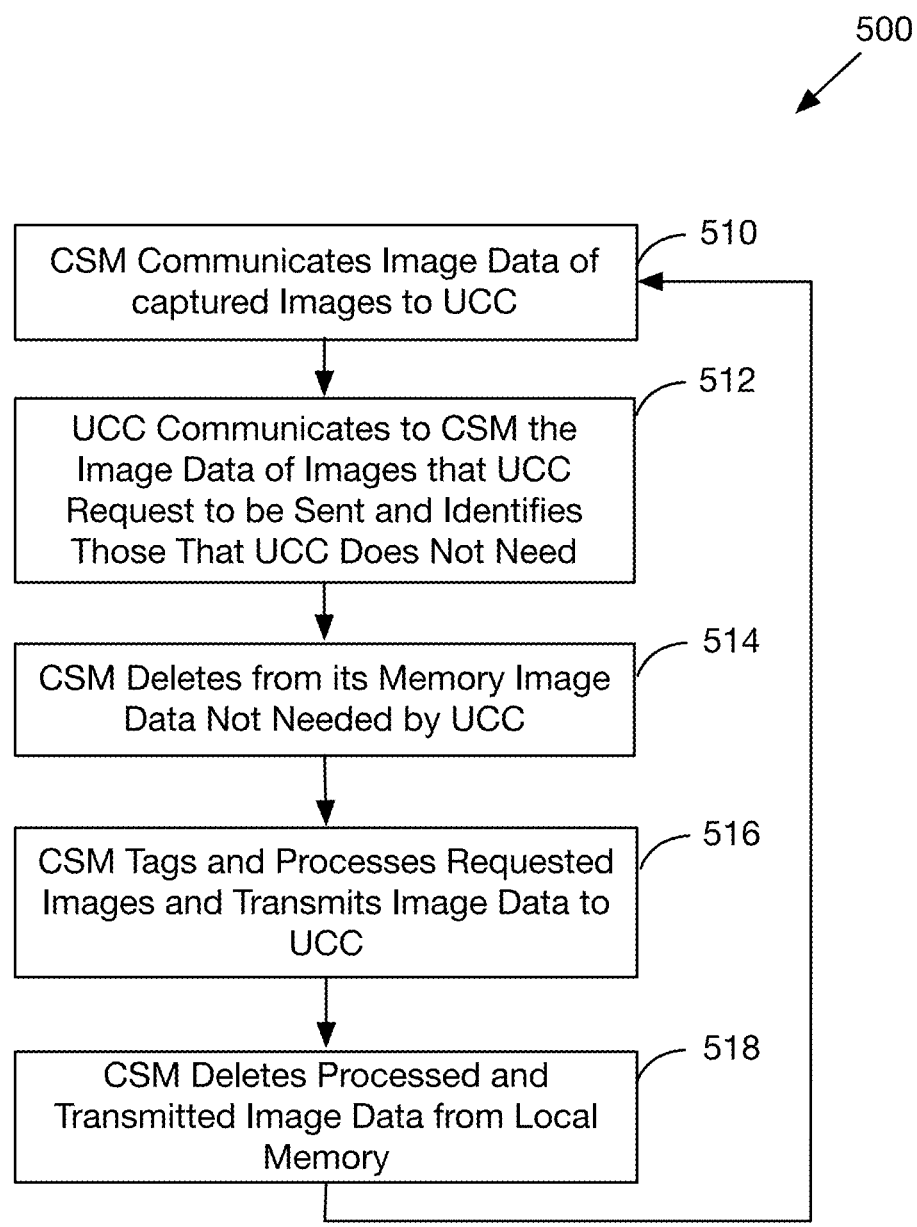
FIG. 5 is a flow chart illustrating a process for communicating between a client device and central computer in accordance with one or more example embodiments.

FIG. 5 is a flow chart illustrating a process 500 for communicating between a client device and central computer in accordance with one or more example embodiments.

CSM device communicates 510 with UCC the locations/ orientations/times (or local addresses) of the images as they are captured and saved in CSM device memory, e.g., in a first-in/first-out order.

In 512, UCC communicates back to CSM device the locations/orientations/times (or local addresses) of images that UCC requests to be communicated and the locations/ orientations/times (or local addresses) of images that UCC does not need.

CSM device may then delete 514 from its memory each image data (e.g., image, location, orientation, time) that is not needed by the UCC.

In 516, CSM device may tag the images that are requested by the UCC, locally process the tagged images that are captured at the same location to reduce transmission data size (e.g., by removing the duplicate data that is common between images), and transmit the combined image data (image, location, orientation, time) to UCC. CSM may then delete 518 the processed and transmitted images and/or image data from its local memory.

Unless UEA is terminated by the Client, the process may return to 510.

Figure 6:
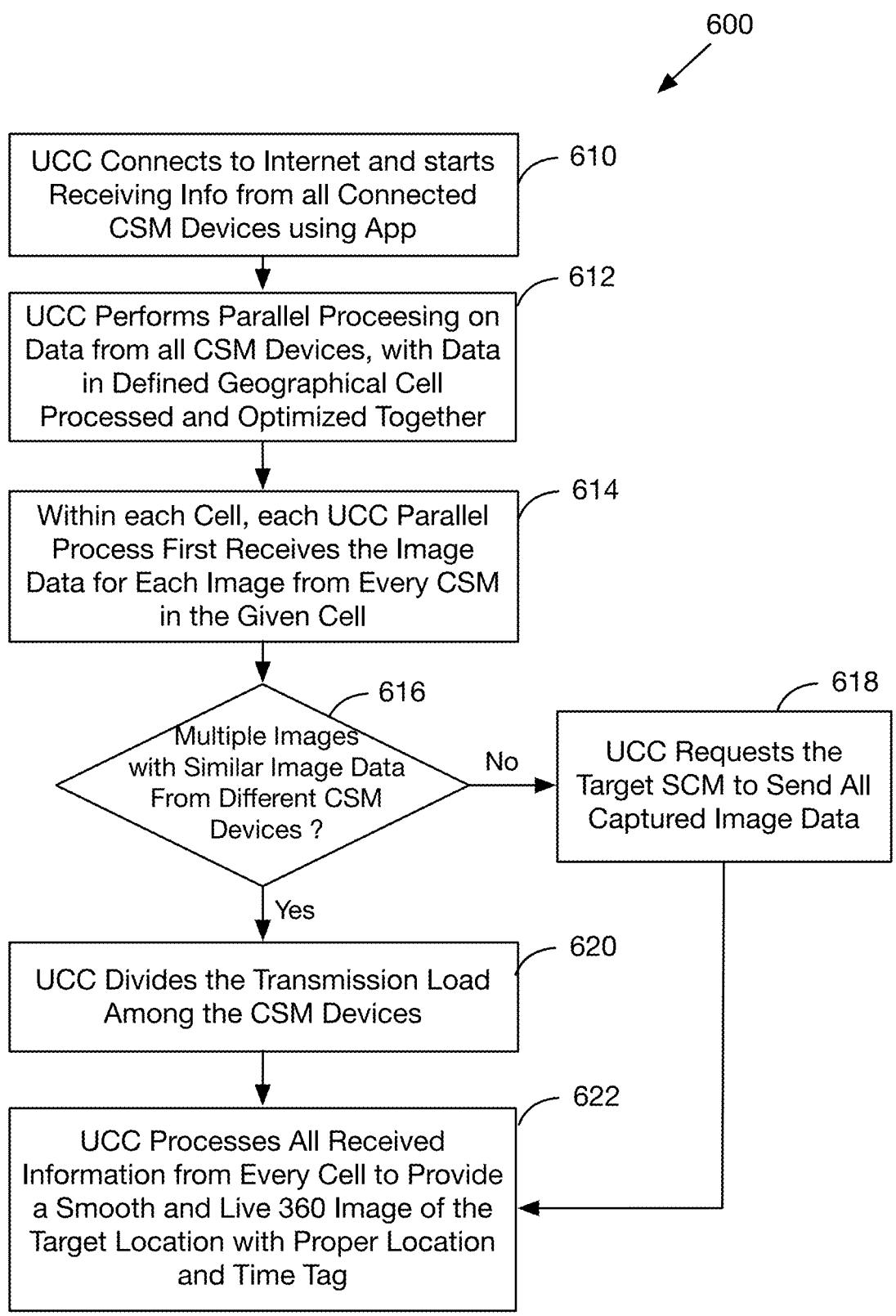
FIG. 6 is a flow chart illustrating features for processing image data by a central computer in accordance with one or more example embodiments.

FIG. 6 is a flow chart illustrating an example method 600 for processing image data by a central computer in accordance with one or more example embodiments.

In 610, the UnifEye Central Computer system connects to the internet and starts receiving information from all connected CSM devices using the UEA App.

UCC then performs 612 parallel processing on the data received from all CSM devices across the globe, but data from within any given geographical cell with a predetermined radius may be processed and optimized together.

Within each geographical cell, each UCC parallel process first receives 614 the coordinates/orientations/times information of each image from every CSM device in the given cell.

In 616, if there are multiple images within similar coordinates/orientations/times window from different CSM device, UCC proceeds to 620 and smartly divides the transmission load among the CSM devices, such that the first image with similar coordinate/orientation/time window is transmitted only by the first CSM device, and a second image with similar coordinate/orientation/time window is transmitted only by a second CSM device, and so on.

If there is only one image with a given coordinate/orientation/time window from a single CSM device, UCC in 618 requests the target CSM to send all its captured image information.

In 622, UCC processes all the received information from every cell to provide a smooth and live 360-degree image of the target location with proper location and time tag.

III. EXAMPLE: APPLICATIONS TO TRAFFIC CONTROL/TRAFFIC LIGHTS (FIGS. 7-9)

The UnifEye solution can also be leveraged for traffic management. When a large enough number of autonomous cars have UnifEye app running on them, a UnifEye central system 220 can capture live traffic information in an area and use that to optimize the traffic load, e.g., by rerouting the flow of heavy traffic streets to lighter traffic areas, or by controlling traffic lights to provide more flow in certain routes and streets to lighten the traffic load in the same location or the connected routes and streets with higher traffic load.

The UnifEye traffic system, e.g., having component features of system 200, can also be implemented by installing smart cameras on traffic lights (or generally on crossroads if possible) when not enough cars have the UnifEye app installed on them, or eventually the two systems can be combined for much better traffic optimization results. With cameras installed at main crossroad traffic lights, these cameras capture and communicate the traffic status at any time to UnifEye intelligent traffic management system, and the system can control the traffic lights' timing to optimize the traffic over the region it covers. In a simple scenario, the solution can be limited to a single crossroad where it receives the traffic information from the cameras in that crossroad and controls its traffic lights to optimize traffic for that specific location. The system can leverage artificial intelligence (AI) computers that can effectively act as a person (like a traffic control officer) who sees and assesses the traffic in that crossroad and controls the lights accordingly for best flow of traffic. The AI computer in the system can leverage machine learning algorithms such as "deep learning" to continually improve its optimization. We can call this local traffic control UnifEye Traffic Cell (UTC). Additionally, a number of UTCs can be networked together and controlled by a larger UnifEye Traffic System (UTS) to optimize the traffic for a larger region under control. The traffic control coverage can be a group of crossroads with traffic lights or can be as large as a whole town or city. The coverage, of course, depends on the number of UTCs under coverage and UTS AI computing power controlling those UTCs. Alternatively, if there are more UTCs in a large city than the UTS can handle and optimize all together, the city can be divided into multiple smaller regions, each region having fewer number of UTCs, so that the UTS is capable of optimizing the traffic in each smaller region separately.

Figure 7:
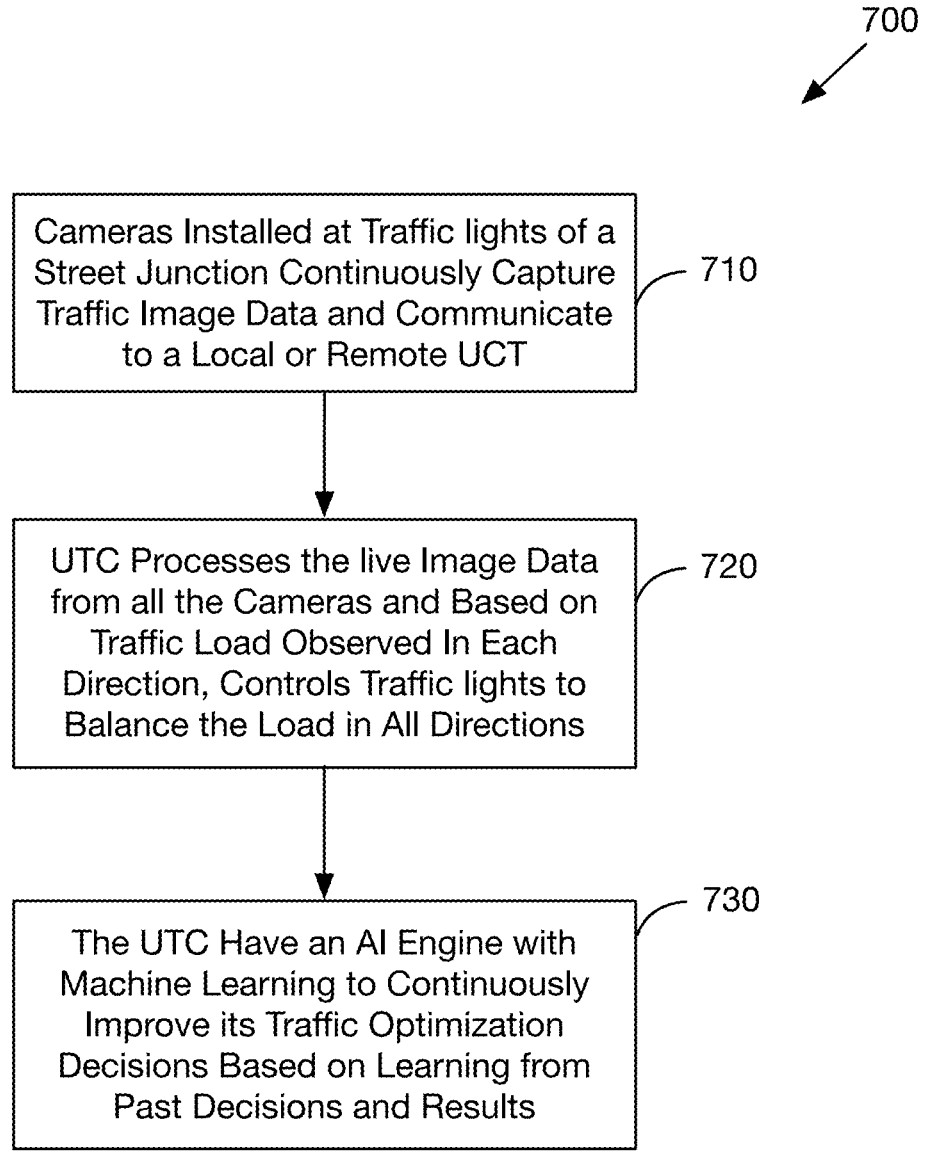
FIG. 7 is a flow chart of an example method for controlling lights in a traffic intersection in accordance with one or more example embodiments.
Figure 8:
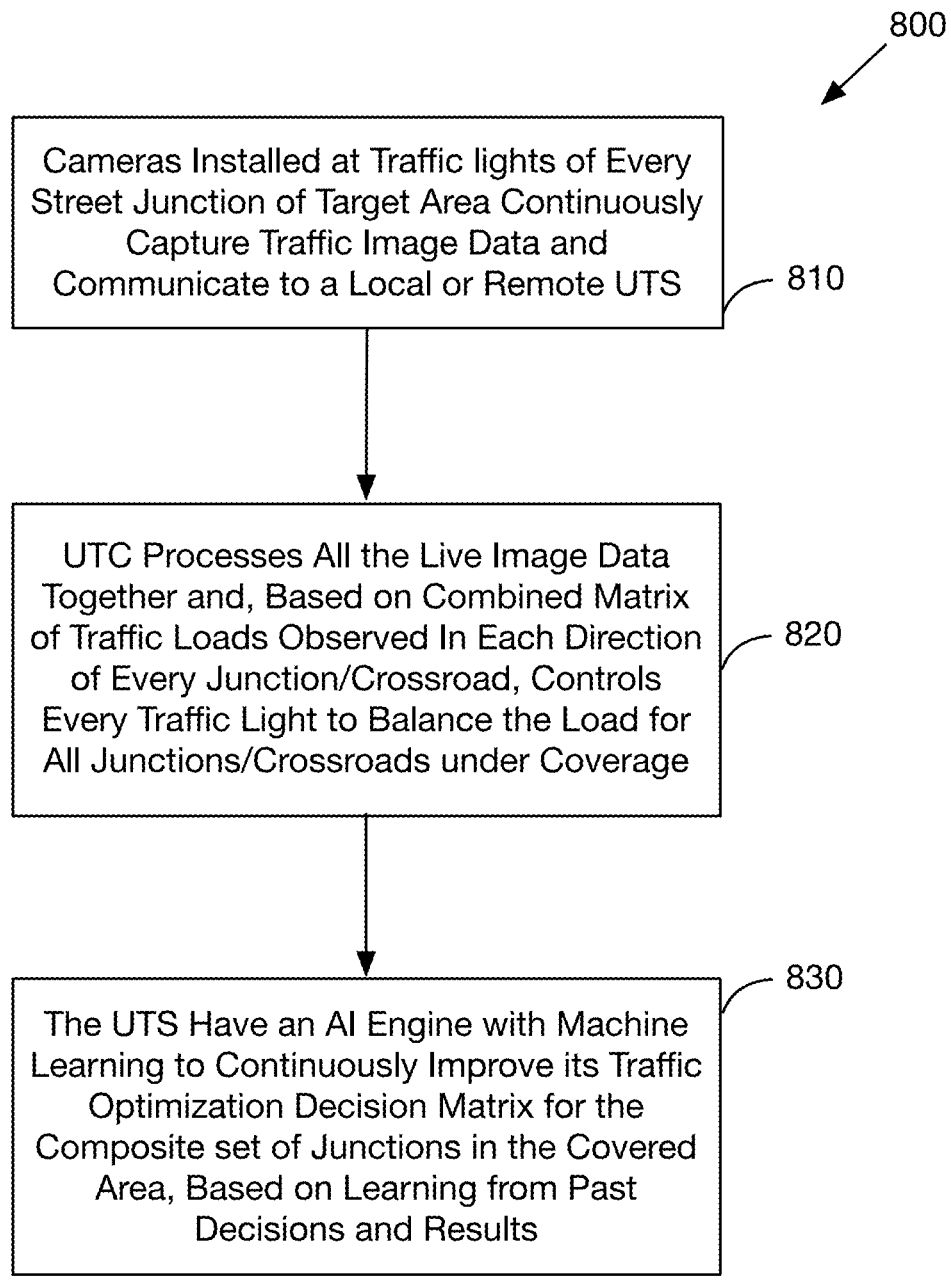
FIG. 8 is a flow chart of an example method for controlling traffic lights in an area of multiple intersections in accordance with one or more example embodiments.

Referring to FIG. 7, an example of UnifEye process 700 for traffic control at an intersection or junction may include installing 710 cameras at the traffic lights of a street junction or crossroad, continuously capturing the traffic image data (image, location, orientation, time) in their line of sight and communicating the image data to a local or remote UTC.

In 720, the UTC processes the live image data from all the cameras and, based on traffic load observed in each direction, it may control the traffic lights to balance the load in all directions at the junction/crossroad in question.

In some embodiments, the UTC may include an AI engine running machine learning (e.g., deep learning) algorithms to continuously improve its own traffic optimization decisions for the specific junction/crossroad at the specific times in a day, days of the week, and holidays in the year, based on the learnings from past control decisions and the results of those decisions at any given time and day.

In some embodiments, it may be important that the cameras are placed inside proper packaging so that they cannot be blocked by dirt or birds, etc. The cameras in this traffic control system can be combined with Radar or Lidar detection devices for improved accuracy, range, and/or increased safety and coverage under bad weather conditions with limited vision so that the information from the cameras can be effective enough. In certain conditions cameras may be considered to be fully replaced with Radar and/or Lidar devices.

The UnifEye traffic system offers a number of other advantages over existing traffic control systems. It eliminates the significant installation, maintenance, and replacement costs of the sensors under the ground to detect cars. The cost of cameras can also be justified by providing the needed monitoring of crossroads by traffic enforcements in case of accidents and certain events, such as traffic violations and more. The UnifEye traffic system also provides a more practical remote diagnostics if something breaks in the sensors or electronic systems. For example, if a camera stops providing any image, it can easily be detected if it is broken or if its view is blocked by viewing the crossroad using other cameras installed at the same crossroad for other directions. This is not possible with ground sensors.

Figure 9:
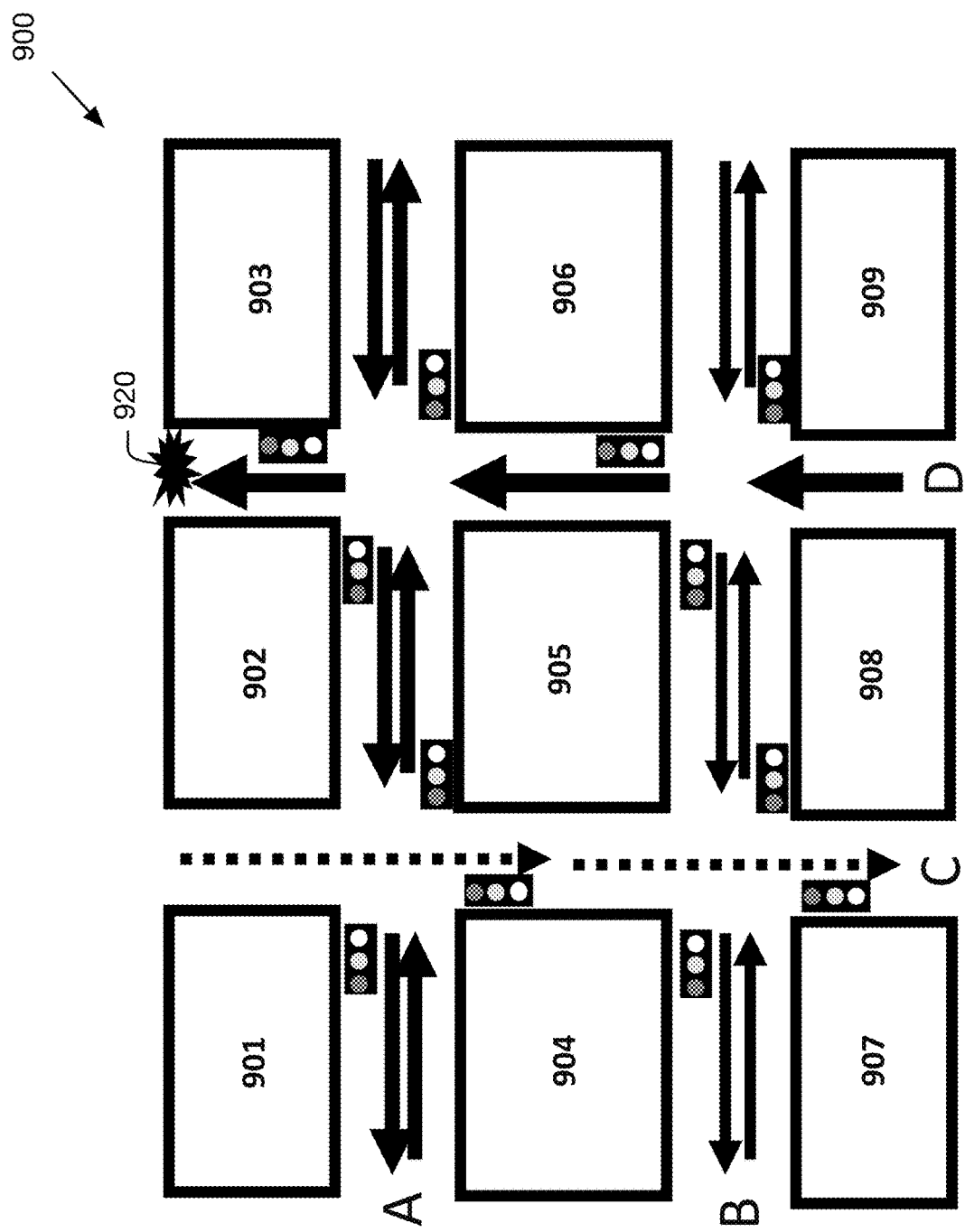
FIG. 9 is a schematic illustration of use of a UnifEye system for traffic control in a multi junction scenario, in accordance with one or more example embodiments.

Turning now to FIG. 9, an example of use of a UnifEye system for control of traffic in a multi junction scenario is shown. Street blocks are depicted as blocks 901, 902, 903, 904, 905, 906, 907, 908, 909, separated by streets A, B, C, and D. In this example, an accident 920 between blocks 902 and 903 has blocked or significantly slowed traffic on street D upwards. In an existing scenario, the traffic control at every downstream junction on street D senses high traffic load, so it keeps its light green for a longer period to clear out traffic. Not only does this not solve the traffic on street D, but it also blocks the main streets A and B.

A UnifEye Traffic System (UTS) as described herein, however, may be used to covering the area in FIG. 9, may be used to "see" the traffic upstream on street D, and does not turn any traffic light downstream till the upstream traffic is cleared. The system may observe how many cars are cleared upstream, and only turns the downstream lights green long enough to let as many cars through as possible. This avoids blockage of main streets A and B. The UTS with artificial intelligence can be smart enough such that once accident 920 on street D is cleared, it keeps the lights on street D green long enough to clear the backlogged traffic more quickly.

The foregoing description illustrates various embodiments along with examples of how aspects of the systems may be implemented. The above examples and embodiments should not be deemed to be the only embodiments, and are presented to illustrate the flexibility and advantages of the systems as defined by the following claims. In the figures, similar symbols typically identify similar components, unless context dictates otherwise. Other embodiments can be utilized, and other changes can be made, without departing from the spirit or scope of the subject matter presented herein. It will be readily understood that the aspects of the present disclosure, as generally described herein and illustrated in the figures, can be arranged, substituted, combined, separated, and designed in a wide variety of different configurations, all of which are explicitly contemplated herein.

With respect to any or all of the sequence diagrams and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the diagrams, scenarios, and flow charts discussed herein, and these diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). Functional aspects described as modules need not be arranged or stored as a unit, and may include instructions, routines or program code distributed, stored and executed in any manner. The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long-term storage, like read only memory (ROM), optical or magnetic disks, flash drives, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices. Similarly, while some processors, computer systems or servers are depicted for purposes of illustration as a single device or module, one skilled in the art will appreciate that the corresponding hardware and software components may be distributed among several computer systems, processors, servers, cloud services or other systems.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The foregoing description illustrates various embodiments of the present invention along with examples of how aspects of the present invention may be implemented. The above examples and embodiments should not be deemed to be the only embodiments, and are presented to illustrate the flexibility and advantages of the present invention. Based on the above disclosure and the following claims, other arrangements, embodiments, implementations and equivalents will be evident to those skilled in the art and may be employed without departing from the spirit and scope of the invention.

What is claimed is:

1. A distributed system, comprising:
 a central computer and a plurality of mobile client devices at different geographical locations,
 wherein each mobile client device comprises or interfaces with a camera and runs a software application to capture graphical images of its current location as well as associated location coordinates of each graphical image, and communicates the combined digital data of each location to the central computer, and
 wherein the software application running on a mobile client device detects the time-sensitive versus non-time-sensitive information in the captured graphical images and uploads to the central computer the time-sensitive information right away and the non-time-sensitive information when the mobile client device has higher data bandwidth.

2. The distributed system of claim 1, wherein the combined digital data further comprises a time of the graphical image capture and a location.

3. The distributed system of claim 2 wherein the plurality of mobile client devices only communicate time, location, and orientation of captured images to the central computer, and the central computer selects a limited set of images from all images captured at approximately the same time, orientation and location by different mobile client devices, and requests the mobile client devices that captured any of those selected images to transmit corresponding graphical image data.

4. The distributed system of claim 3, wherein each mobile client device receives a list of the selected set of images, transmits the requested graphical image data, and deletes the remaining graphical image data from a local memory of the mobile client device.

5. The distributed system of claim 1, wherein the central computer collects the combined digital data of every location from a plurality of mobile client devices in a region and continuously updates and processes the combined digital data to provide the most current graphical information of each location.

6. The distributed system of claim 5, wherein the plurality of mobile client devices are smart vehicles that are equipped with digital cameras and a Global Positioning System (GPS) device, and the image received from each smart vehicle is processed based on its GPS data as well as the relative location of the common landmarks in each image, so a previous image of a certain location from one smart vehicle can be updated with a new image of that location from another smart vehicle.

7. The distributed system of claim 1, wherein the plurality of mobile client devices are smart vehicles equipped with digital cameras that capture digital images of the locations each smart vehicle travels by with similar orientations, angles and directions, thereby enabling constructing 360-degree images.

8. The distributed system of claim 1, wherein each mobile client device includes a Global Positioning System (GPS) device, and whrein a decision to upload a new image from the mobile client device to the central computer is dependent on an amount of change in the mobile client device location as measured by the mobile client device's GPS device.

9. The distributed system of claim 1, wherein the software application running on the mobile client device detects humans and animals in the captured images, and reduces the image resolution where there are humans or animals detected.

10. The distributed system of claim 1, wherein the mobile client device uploads a lower resolution of the graphical images captured as soon as there is a data connection, and uploads a higher resolution of the graphical images when the mobile client device has higher data bandwidth.

11. The distributed system of claim 1, wherein to reduce the amount of graphical data storage on the central computer, the number of captured images within a certain window of time is reduced based on how far in the past it was captured.

12. The distributed system of claim 1, wherein the central computer hides the identity of people in the captured graphical images before sharing the graphical images with a user.

13. A distributed system, comprising:
a central computer and a plurality of smart vehicles at different geographical locations,
wherein each smart vehicle comprises a camera and runs a software application to capture graphical images of its current location as well as associated location coordinates of each graphical image, and communicates the combined digital data of each location to the central computer,
wherein the central computer collects the combined digital data of every location from a plurality of smart vehicles in a region and continuously updates and processes the combined digital data to provide the most current graphical information of each location, and
wherein if a smart vehicle is not traveling at a lower speed than an average speed of the smart vehicles on a same street, to reduce the amount of data uploaded, the image data is limited to the side images of the smart vehicle excluding front and rear images.

14. A distributed system, comprising:
a central computer and a plurality of smart vehicles at different geographical locations,
wherein each smart vehicle comprises a camera and runs a software application to capture graphical images of its current location as well as associated location coordinates of each graphical image, and communicates the combined digital data of each location to the central computer,
wherein the central computer collects the combined digital data of every location from a plurality of smart vehicles in a region and continuously updates and processes the combined digital data to provide the most current graphical information of each location, and
wherein when multiple smart vehicles connected to the central computer are detected to be traveling on a same road, the data upload of images from different positions along the road is distributed among the multiple smart vehicles so as to reduce the upload rate on a single device smart vehicle.

15. A distributed system, comprising:
a central computer and a plurality of smart vehicles at different geographical locations,
wherein each smart vehicle comprises a camera and runs a software application to capture graphical images of its current location as well as associated location coordinates of each graphical image, and communicates the combined digital data of each location to the central computer,
wherein the central computer collects the combined digital data of every location from a plurality of smart vehicles in a region and continuously updates and processes the combined digital data to provide the most current graphical information of each location, and
wherein when the central computer detects a newly connected smart vehicle traveling through a road that a first connected smart vehicle traveled through within a predefined time window, the central computer informs the first connected smart vehicle that is still uploading image information of that road to lower its upload rate by uploading images captured at larger distance from each other, and informs the newly connected smart vehicle to capture images at locations that the first smart vehicle is not uploading.

* * * * *